Sept. 22, 1964   T. R. FINKE   3,149,560
PRESS APPARATUS
Filed July 13, 1962   4 Sheets-Sheet 1

INVENTOR.
THEODORE R. FINKE
BY Bosworth, Sessions
Herrstrom & Knowles
ATTORNEYS Sept. 22, 1964   T. R. FINKE   3,149,560
PRESS APPARATUS Filed July 13, 1962   4 Sheets-Sheet 2

INVENTOR.
THEODORE R. FINKE
BY Bosworth, Sessions
Herrstrom & Knowles
ATTORNEYS

Sept. 22, 1964  T. R. FINKE  3,149,560
PRESS APPARATUS
Filed July 13, 1962  4 Sheets-Sheet 3

INVENTOR.
THEODORE R. FINKE
BY Bosworth, Sessions
Herrstrom & Knowles
ATTORNEYS Sept. 22, 1964  T. R. FINKE  3,149,560

PRESS APPARATUS

Filed July 13, 1962  4 Sheets-Sheet 4

INVENTOR.
THEODORE R. FINKE
BY Bosworth, Sessions,
Herndon & Knowles
ATTORNEYS

3,149,560
PRESS APPARATUS
Theodore R. Finke, Euclid, Ohio, assignor to The Euclid Products Co., Inc., Willoughby, Ohio, a corporation of Ohio
Filed July 13, 1962, Ser. No. 209,569
19 Claims. (Cl. 100—53)

This invention relates to presses, and more particularly to presses which may be manually closed and automatically opened.

For convenience the problems solved by and the advantages of the invention will be discussed in connection with presses for applying heat and pressure to seal together sheet materials at least one of which is formed of or coated with thermoplastic material. Presses of this general type are widely used for various purposes, and particularly for applying patches of cloth coated with or formed of thermoplastic materials to fabric articles, such as garments, bed sheets, hospital operating sheets and the like. Most of the presses heretofore successfully used for these purposes are automatically closed and opened by air or other fluid actuated power means. Consequently they are quite heavy and hence not readily portable, relatively expensive because of their automated design, and limited as to locations of use because they require a source of air or other energizing fluid under pressure.

A considerable demand exists for heat sealing presses, capable of performing the above operations, which are less expensive, sufficiently portable so that they can be readily carried from place to place by one person, and which can be manually closed so that they do not require the use of an energizing fluid under pressure. Such a press should be simple and safe to operate, should not require the exertion of a considerable amount of manual operating effort or force since it should be capable of operation by women, should be of durable construction and should effectively perform the heat sealing functions. For safety, it should not spring open rapidly with a shock which can dislodge the apparatus or cause rapid movement of parts which could strike the operator. Notwithstanding these features, the cycle of closing, heat-sealing and opening of the press should be short enough to avoid excess use of operator's time.

It is therefore one of the principal objects of the invention to provide a portable manually operable press which satisfies the above requirements.

It is another object of the present invention to provide a press which may be used for the heat sealing of thermoplastic materials and which may be constructed to be portable and manually operable and to satisfy all of the above requirements and provide other important advantages. It is a further object of my invention to provide a heat sealing press which is simple in operation, rugged in construction, and which can be manufactured at a reasonable cost. These and other objects of the invention will become apparent from the following description of a portable, manually closable, automatically operable heat sealing press embodying and representing the best known mode of practicing the invention. This description is made with reference to and in connection with the appended drawings in which:

The illustrated embodiment of the invention comprises a stationary lower base 1 pivotally carrying a movable upper arm 2. Base 1 carries an unheated lower platen 3, preferaby by means resiliently supporting it to permit slight downward movement under pressure.

An upper platen 4, adapted to be heated, is mounted on the upper arm 2 so it can be moved a short distance toward the upper arm and away from the upper arm as described later. The upper arm can be pivotally moved downwardly toward the base and the upper platen 4 can be moved relatively to the upper arm away from the upper arm and toward the lower platen 3, by manual manipulation of pivoted operating lever 5, as described later.

The upper platen has a pressing surface 6 formed of smooth flat metal, which is electrically heated to a desired temperature determined by the setting of knob 7, and thermostatically controlled by suitable means enclosed in housing 8 on the platen which may be conventional and requires no detailed description. The lower platen carries a pad of resilient heat resistant material 9, such as silicone sponge rubber, as the lower pressing surface. A switch 10 is provided to control the supply of electrical current to the apparatus.

Figure 1:
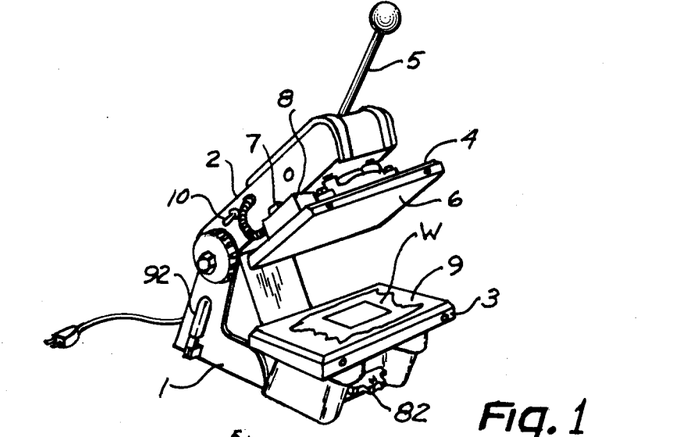
FIGURE 1 is a perspective view of the press in open position with its platens separated, ready to be manually closed.

At the beginning of a pressure sealing cycle, the press is open in its normal nonoperative position as shown in FIGURE 1 with the pivotally mounted upper arm 2 upwardly inclined, the platens 3 and 4 being spaced apart, the operating lever 5 in its forward position. The apparatus is connected to a source of electrical energy through the switch 10. The upper platen 4 is heated to a temperature determined by the setting of the knob 7 at all times while the apparatus is connected to a source of electric current.

Work W to be sealed, taking the form of sheet material, is placed on the lower platen. The operating lever 5 is first manually pulled forward toward the operator and down to move the upper arm downwardly to the position shown in FIGURE 2, in which position it is locked in operation of the apparatus; this brings the upper platen initially into close spaced relation to the lower platen and the work on it. Thereafter, the lever 5 is manually pushed to its rearmost position, shown in FIGURE 3, which moves the upper platen down the remaining short distance into the desired sealing and heating contact with the work W on the lower platen.

Figure 12:
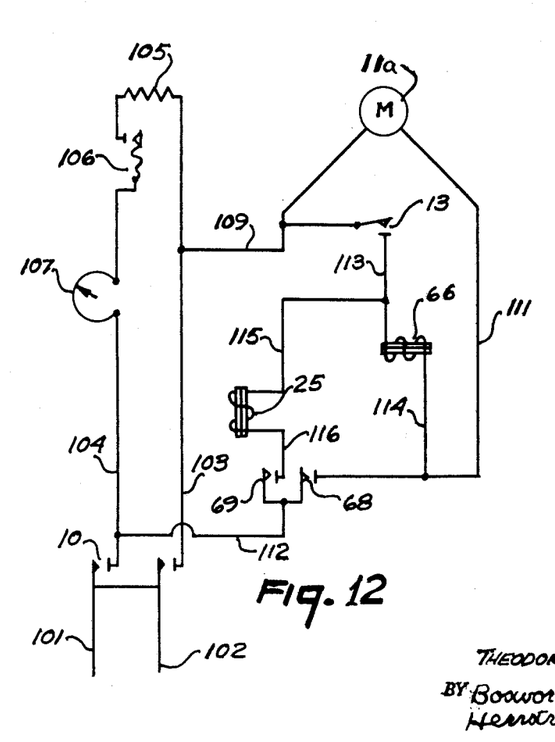
FIGURE 12 is a diagram of the electrical circuit employed in the illustrative embodiment.

As soon as the lever 5 reaches its rearmost position, an electrically driven timer 11 inside of the upper arm is caused to start operating by means later described. This timer is of a conventional commercially available type comprising a motor 11a (FIGURE 12) that, when electrically energized, operates over a period of time predetermined by the setting of a pointer 12, and then closes an electrical switch 13 (FIGURE 12). The timer includes conventional spring means to reverse its operation after its motor is deenergized to open the switch 13 and return the pointer 12 to its original set position. After the timer has started, it continues operation until the pointer 12 reaches its zero position, closing the switch 13 and thereby initiating operation of mechanism to be described later which causes the upper platen initially to retract a short distance, the upper arm 2 thereafter to swing upwardly to its retracted position, and the operating lever 5 to move forwardly to the position shown in FIGURE 1. As the upper arm moves to its retracted position, the timer reverses as indicated above.

Figure 8:
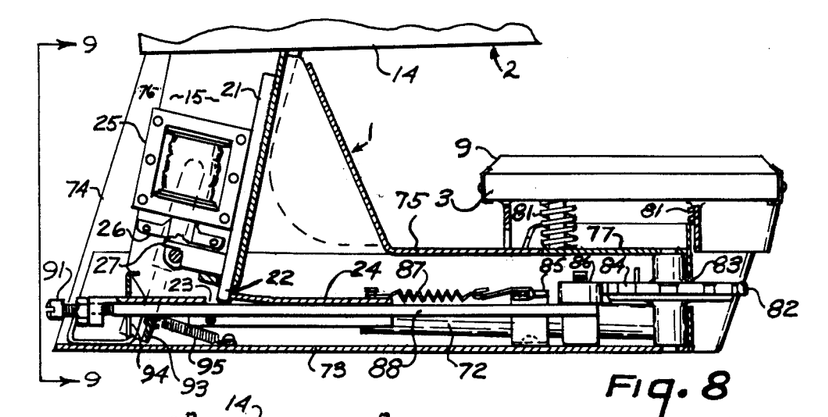
FIGURE 8 is a fragmentary sectional elevation showing principally the base, taken generally along line 8—8 of FIGURE 7 and to the same scale as FIGURE 7.
Figure 9:
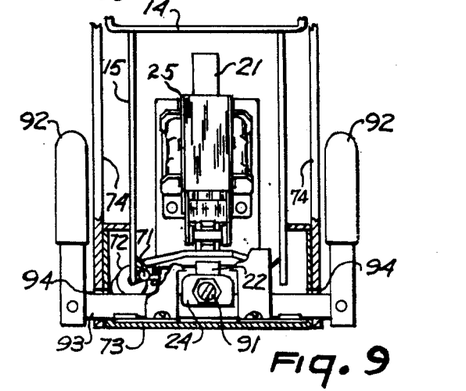
FIGURE 9 is a fragmentary rear view showing principally the lower portion of the base and upper arm with the rear cover of the base plate removed to show internal structure, the view being taken substantially along line 9—9 of FIGURE 8 and to the same scale.

More specifically, the upper arm 2 is generally L-shaped; it has a forward laterally extending portion 14 (FIGURES 1–6) and, rigidly fixed to it, a downwardly extending rear portion 15 (FIGURES 8 and 9). The arm 2 is of generally U-shape in cross section, being formed of spaced parallel side walls 16 joined to a bottom wall 17. The upper arm is received at its rear end between confronting spaced parallel surfaces of upstanding portions of the base and is pivotally mounted on the base 1 as by suitable horizontal shaft means received through the upstanding base portions and conventional hollow pivot members 18 containing coil springs 19 which bias the upper arm toward its retracted position shown in FIGURE 1; members 18 may be adjusted to change the biasing force.

Figure 2:
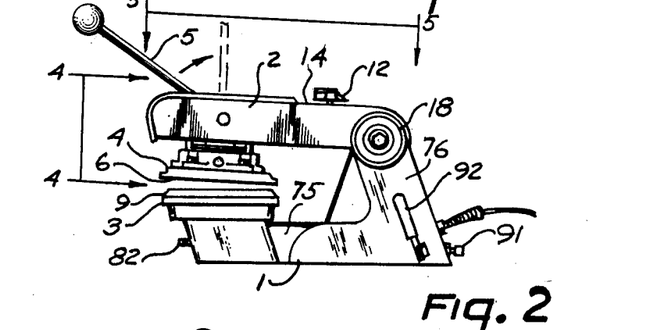
FIGURE 2 is a side elevation of the press of FIGURE 1 at the conclusion of the initial portion of the closing operation.
Figures 10, 11:
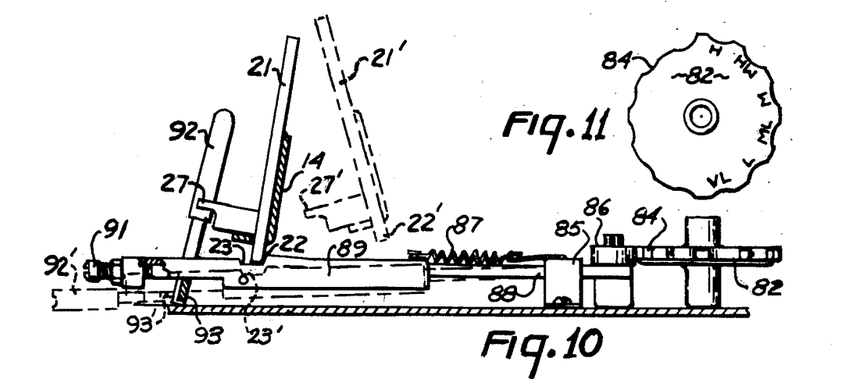
FIGURE 10 is a somewhat diagrammatic representation of the means for latching and adjusting the upper arm relatively to the base, and the means for providing emergency release of the upper arm, the view being generally based on FIGURE 8 and to the same scale.
FIGURE 11 is a plan of the adjusting knob, to show its camming shape.

The upper arm is initially manually moved to its utmost downward position shown in FIGURE 2 by pulling on the operating lever 5 while it is forwardly positioned. A gravity biased elongated downwardly extending rear latch 21 (FIGURES 8, 9, 10) is slidably mounted and guided for endwise movement in the downwardly extending rear portion 15 of the upper arm; the latch bar which has swung clockwise to the position shown in FIGURE 8 by the closing movement of the upper arm, engages at its lower end 22 in a notch 23 in a keeper member 24 extending longitudinally in the base 1 of the apparatus. A solenoid 25 is fixed to the downwardly extending portion 15 of the upper arm and has an armature 26 carrying a pin engaging under a lug 27 on the latch 21 so when the solenoid is energized the armature moves upwardly and lifts the guided latch 21 with it, thus disengaging its lower end 22 from the keeper notch 23 and allowing the biasing pivot members 18 to swing the arm 2 upwardly.

Figure 3:
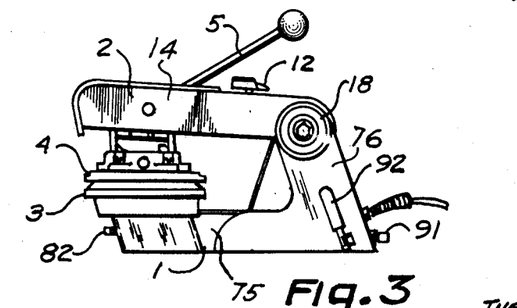
FIGURE 3 is a side elevation of the press at the conclusion of the complete closing operation.
Figures 4, 4A:
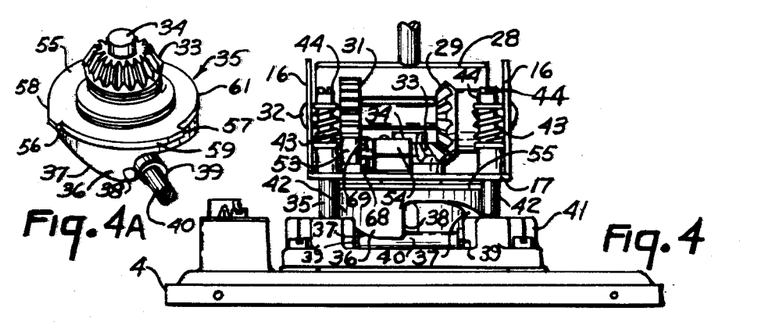
FIGURE 4 is an end elevation of the movable upper arm of the press with the cover removed, taken substantially along line 4—4 of FIGURE 2 but to a considerably larger scale, the parts being shown in the relation they assume when the operating lever is in the intermediate position shown in broken lines in FIGURE 2.
FIGURE 4A is a perspective of the rotatable wedge member which cooperates with other parts to move the upper platen away from the upper arm.
Figure 5:
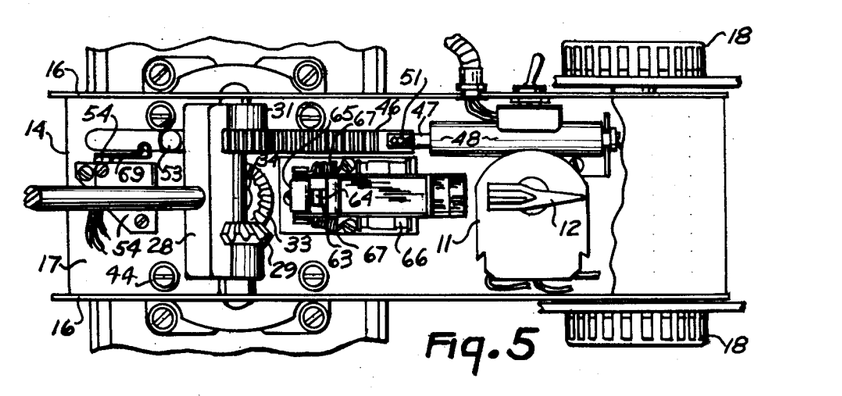
FIGURE 5 is a fragmentary view from line 5—5 of FIGURE 2 but to the same scale as FIGURE 4, the cover of the upper arm being broken away to show mechanism in the arm.
Figure 6:
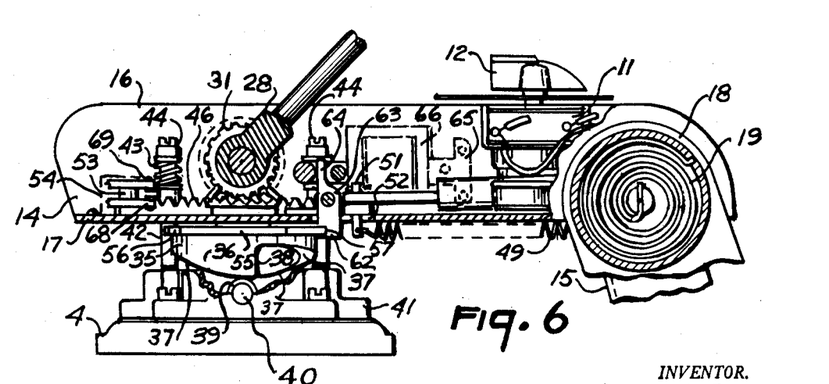
FIGURE 6 is a fragmentary side elevation showing principally the upper arm, to the same scale as FIGURES 4 and 5, parts being broken away to show the internal mechanism of the arm when the operating lever is in the position shown in FIGURE 3.
Figure 7:
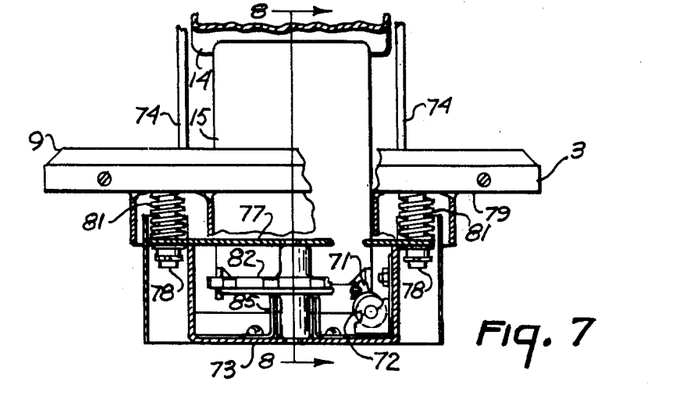
FIGURE 7 is a fragmentary front elevation showing principally the base and lower platen, to the same scale as FIGURE 4–6, part being broken away to show the internal structure.

As shown in FIGURES 4, 5 and 6, the operating lever 5 on arm 2 is connected at its lower end to a cross member 28 rigidly fixed to both a driving bevel gear 29 and a spur gear 31 mounted on the same axle 32 rotatably carried by the forward portions of side walls 16 of the upper arm. When the lever 5 is manually moved to its rearmost position, shown in FIGURE 3, it rotates the driving bevel gear 29, which in turn rotates a driven bevel gear 33 fixed to a generally upright axle 34 carrying a rotatable wedge member 35 journalled for rotation but not for axial movement in and relative to the upper arm 2.

The rotatable wedge member 35, shown to advantage in FIGURES 4, 4A and 6, comprises two inclined ramp portions 36 which are identical and spaced 180° apart around the axis of rotation of the wedge member. Each ramp has an inclined axially and downwardly facing ramp surface 37 the lowest portion of which is adjacent a shoulder 38 in which the highest portion of the other ramp surface terminates; both shoulders 38 face opposite to the direction in which the wedge member rotates when the lever is manually moved rearward. Each ramp surface 37 is shown as uniformly inclined, although if desired they may have other suitable but identical configurations.

Bearing against both of these ramp surfaces 37 are follower rollers 39 rotatably supported on a cross shaft 40 the ends of which are received in a frame 41 bolted to and supporting the upper platen 4. This frame 41 is nonrotatably, slidably, and resiliently supported on four spaced parallel bolts 42 fixed to the frame 41 in distributed relation in a rectangular pattern and extending upwardly with clearances through the bottom wall 17 of the upper arm 2, compression springs 43 being disposed between heads 44 on the bolts and the bottom wall 17 so that the platen-carrying frame is resiliently biased upwardly toward the upper arm 2, the follower rollers 39 being held thusly against the inclined ramps 37. Rotation of the driven bevel gear 33 caused by manual movement of the lever 5 toward the rear causes the wedge member 35 to rotate and its inclined ramp surfaces 37 to wedge or press against the rotatable rollers 39 and force the frame 41 and platen 4 carried thereby downwardly away from the upper arm against the resistance of the springs 43 to an extreme position determined by the dimensions and adjustment of the apparatus. This mechanism thus provides relatively high mechanical advantage compared to the simple lever arrangement used to effect preliminary closing of the press, and balanced forces urging the platen downwardly because of the identical equally spaced ramp surfaces and rollers provided thereby. The rollers 39 therefore rotate about an axis which extends transversely of the upper arm 2, and which is at all times perpendicular to the axis of rotation of the wedge member 35 and in a fixed plane containing the axis of rotation of the wedge member while the platen assembly moves toward and away from the arm 2 in a guided path fixed relatively to the arm.

The spur gear 31, fixed to and coaxial with the drawing bevel gear 29, engages a rack 46 slidably longitudinally mounted in the upper arm. The rear end of this rack is connected to a piston rod 47 of a fluid-containing motion retarding cylinder assembly 48 which may be of conventional type, and also to one end of tension spring 49 located below the web 17 of the upper arm by a pin 51 on the rack 46 extending through a slot in the bottom wall of the upper arm. The other end of the spring 49 is connected to the downwardly extending portion 15 of the upper arm. Spring 49 is strong enough, when the parts are released, to pull the rack 46 toward the rear of the upper arm, and rotate the spur gear 31 so the wedge member rotates to permits lifting of the upper platen and so the operating lever 5 moves toward the front of the apparatus. The front end of the rack 46 carries an upwardly projecting post or cam portion 53 which can engage an electric limit switch 54 fixed in the front portion of the upper arm, for a purpose to be later described.

The rotatable wedge member 35 also rigidly carries an upper flat cam plate portion 55 (FIGURES 4A and 6) extending transversely thereof and perpendicular to the axis of rotation of the wedge member. This cam plate portion has two angularly spaced radial shoulders 56 and 57 extending parallel to the axis of rotation of the wedge member, the peripheral or outermost portions of the cam plate 55 provide inclined ramps 58, 59 leading to these shoulders from generally circular or arcuate portion 61 forming a substantial portion of the cam plate and being centered on the rotational axis of the shaft 34.

These shoulders are suitably angularly spaced so that when they engage the lower latch end 62 of a trigger member 63 carried by the upper arm, they limit rotation of the wedge member and hence limit the movement of the rack 46 to either of its extreme positions and the lever arm 5 to each of its extreme positions, as follows:

Trigger member 63 is pivotally mounted on a horizontal pin suitably supported above the upper surface of the bottom wall 17 of the upper arm. The lower or latch end 62 of member 63 projects downwardly through an opening in the bottom wall and with surrounding clearance. Upper portion 64 of this trigger member is engaged by armature 65 of a solenoid 66 also mounted on and fast to the bottom wall 17. The solenoid armature is adapted to swing the trigger 63 on its pivot, counterclockwise as viewed in FIGURE 6, when the solenoid is energized, thus releasing the trigger latch end from one of the shoulders 56, 57; the armature is biased to the right or rearwardly by springs 67 to swing the trigger clockwise (FIGURE 6) and thus cause the lower latch end 62 of trigger member 63 to be urged toward the axis of the rotatable wedge member 35 to intercept one of the shoulders. When the operating lever 5 is in the extreme forward position of FIGURE 1, the shoulder 56 on the cam plate of the rotating wedge member 35 engages the downwardly projecting latch end 62 of the trigger member 63 and prevents further rotation of the wedge member 35 and the bevel and spur gears connected thereto, further forward movement of the operating lever 5 relatively to the upper arm, and further rearward movement of the rack 46. As the operating lever 5 is then moved manually to its rearmost position, the lower latch end of the trigger member rides up the ramp 59 on the cam plate 55, and engages behind the other shoulder 57 on the cam plate; the latch end 62 of trigger member 63 thus locks the above indicated parts with the operating lever 5 in its rearmost position.

At the expiration of the time for which the timer 11 has been set, the timer closes its switch 13, which energizes the solenoid 66 in the upper arm, so it moves the pivoted trigger member 63 to disengage its latch end 62 from the shoulder 57 of the cam plate 55, thus permitting the tension spring 49 to draw the rack 46 towards the rear of the upper arm, such movement being retarded by the damping cylinder 48. Such movement of the rack causes the spur gear 31 to rotate, which in turn rotates the shaft 32 and the driving bevel gear 29 counterclockwise as viewed in FIGURE 6, and thus rotates the driven bevel gear 33 meshed with the gear 29 counterclockwise as viewed in FIGURE 5; it also causes the operating lever 5 to move automatically to the front of the press to its forward position. Such rotation of the driven bevel gear 33 also turns the rotatable wedge member 35 until the shoulder 56 on its cam plate 55 engages the latch end 62 of the biased pivoted trigger 63. Such rotation of the wedge member 35 also moves its ramp surfaces 37 so that the roller members 39 bearing against them can move toward the upper arm, so that the platen frame 41 carrying the roller members and the upper platen 4 can be drawn upwardly by the platen supporting springs 43 a short distance toward the upper arm and away from the lower platen.

The limit switch 54 mounted on the front end of the upper arm has two outwardly biased, inwardly depressible contact members 68 and 69 (FIGURE 4). The limit switch and the rack 46, are so relatively located that the lower contact member 68 is depressed by the rack, and remains depressed at all times while the rack 46 is forward of its extreme rearmost position and the operating lever 5 is rearwardly of its foremost position, to complete an electrical circuit to the motor of the timer 11, causing it to operate during the preset time for which the timer pointer is set. After expiration of such preset time, the timer then energizes the solenoid 66 on the upper arm to move the trigger member 63 to release the rotatable wedge member 35 and allow the rack to start moving rearwardly under the tension force exerted by its spring.

Shortly after the rack starts moving, the portion 53 of the rack depresses the other contact member 69 of the switch 54, which energizes the solenoid 25 at the rear of the press. This solenoid lifts the lower end 22 of the latch 21 carried by the rear portion of the upper arm out of the notch 23 in the keeper member 24, thus allowing the coil springs and the pivot members 18 to swing the upper arm 2 upwardly to its retracted position shown in FIGURE 1, the latch 21 then being in the position shown in broken lines in FIGURE 10. A piston rod 71 of a fluid-containing motion-retarding cylinder 72 is pin connected to the lower end of the upper arm while the cylinder is pin connected to the base portion to slow the motion sufficiently for safety.

The base 1 comprises a horizontal bottom wall 73 joined to spaced parallel upwardly extending side walls 74. The side walls are formed to define a laterally extending front portion 75 and an upwardly extending rear portion 76 on which the upper arm 2 is pivotally mounted. The front portion of the base includes a transverse horizontal platform portion 77 formed with apertures through which extend studs 78 threaded into frame 79 of the lower platen 3. The studs 78 are distributed in a rectangular pattern and their heads or spacers held by their heads engage against the underside of the platform portion 77 to captivate the lower platen in relation to the press base. Compression springs 81 encircle the studs between the transverse portion 77 and the frame 79, to provide substantial resilient forces urging the bottom platen upwardly.

The illustrated press has had both coarse adjusting means and fine adjusting means to permit adjustment of the relationship of the upper platen 4 relatively to the lower platen 3. The coarse adjusting means comprises an adjusting knob 82 mounted in the forward end of the front portion 75 of the base 1 for manual rotation about a fixed vertical axis and laterally projecting from a slot 83 at the front of the base of the apparatus. The knob is assymetrical in that it has a series of spaced notches or depressions 84 along a portion of its periphery, at progressively increasing distances from the axis of rotation of the knob. The keeper member 24 is slidably mounted longitudinally of the bottom wall 73 of the base 1 in one or more brackets 85. At its forward end the member 24 has a roller 86 adapted to engage the notches 84 in the knob 82. The keeper member is resiliently urged so the roller contacts the knob by a tension spring 87 connecting the keeper member and bracket 85. Rotation of the knob, under the tension of spring 87 causes the roller 86 to ride the periphery of the knob and successively move into the notches 84 the bottoms of which are at different distances from the knob axis of rotation, which is fixed relatively to the base 1. This causes the keeper member 24 and the notch 23 therein to move to various positions longitudinally of the base. In this manner can be varied the location of the rear latch member 21 when it engages the notch 23, and hence the location of the depending portion 15 of the upper arm 2 longitudinally of the base 1 and the distance of the upper arm 2 from the lower platen 3. This provides a coarse adjustment by steps depending on the number and depth of notches in the adjusting knob 82.

The apparatus under consideration also includes a fine vernier-type adjustment, primarily for compensating for wear or permanent compressive deformation of pad 9 of the lower platen 3. For this purpose, the keeper member 24 is made up of an elongated bar 88 the forward end of which carries the knob-engaging roller 86 and the rear end of which extends nearly to the rear end of the keeper member as a whole, and a sleeve 89 which slidably fits over the bar 88 so as it is capable of longitudinal but no transverse movement relatively to the bar. This sleeve contains the notch 23 of the keeper member. The spring 87 also biases this sleeve toward the front of the bar 88. A screw 91 is threaded into the rear end of the sleeve member 89, which constitutes the rear end of the keeper member 24 as a whole, to bear against the rear end of the bar 88. Rotation of the screw 91 thus provides a fine adjustment of the position of the notch in the keeper member longitudinally of the base, and hence of the lowermost location of the upper arm relatively to the platen.

The apparatus also includes means providing emergency manual release for the upper arm so it can swing upwardly independently of automatic release. This comprises a pair of pivotally supported companion levers 92, one at each side of the rear of the base portion of the apparatus; they are fixed to the projecting ends of a cross bar 93 having a rectangular cross section and extending under the keeper member 24 through openings 94 in the side walls 74 of the base 1. A tension spring 95 is connected between the base of the apparatus and the upper edge of the cross bar 93 so that the maximum cross section dimension of the cross bar and the levers 92 attached to it are biased to urge them to turn clockwise as viewed in FIGURES 8 and 10, to a normal position just beyond dead center. Manual movement of either of the levers 92 downwardly toward the rear of the base 1 causes the cross bar 93 to turn counterclockwise as viewed in FIGURES 8 and 10 and to lie flat, as shown in broken lines in FIGURE 10, which allows the keeper member 24 resting by gravity on the cross bar to lower to a position, shown in broken lines in FIGURE 10, where its notch 23 disengages from the lower end 22 of the rear latch member 21, thus allowing the coil springs 19 in the pivot members 18 to swing the arm upwardly to the position shown in FIGURE 1.

In the electric circuit diagram of the illustrated apparatus shown in FIGURE 12, 101 and 102 are lines to a source of electrical energy, which energy may be connected and disconnected by the switch 10. Wires 103, 104 from the leads supply current to the heater 105 for the upper platen, the circuit including a thermostat 106 (enclosed in housing 8, FIGURE 1) for maintaining a temperature present by control means 107 adjusted by the knob 7 (FIGURE 1).

The motor 11a of the timer 11 is connected by wire 109 to current supply wire 103, and by wires 111, 112 through the normally open lower contact members 68 of the limit switch 54 (FIGURE 5) to current supply wire 104.

The timer motor 11a controls the normally open timer switch 13. When the timer switch 13 is closed by the motor 11a, and the contact members 68 are closed by forward movement of the rack 46, a circuit is completed from the wire 103 through wires 109, 113, 114, the switch 68 and wire 112 which energizes the solenoid 66 controlling the release of the wedge member 35 and the rack 46.

Also, when the timer switch 13 is closed by the timer and the contact members 69 of the limit switch 54 is closed by the cam portion 53 of the rack 46, a circuit is completed through the wires 109, 113, wires 115, 116 and the wire 112 to energize the solenoid 25 which disengages the rear latch member 21 from the notch 23 of the base keeper member 24 to allow the arm to retract.

The apparatus operates as follows, assuming the parts are in the position of FIGURE 1, the electrical current is connected by the switch 10 and the upper platen 4 is heated to a temperature preset by the control 107 and maintained by the thermostat 106, and the work W to be subjected to heat and pressure is on the lower platen 3. The switches 13, 68 and 69 are open.

The operating lever is first pulled down to move the upper arm 2 to its lowermost position where the lower end of its latch member 22 engages the notch 23 in the keeper member 24, the longitudinal position of the notch 23 having been adjusted as described above to bring the upper arm to the desired relation to the lower platen so that the upper platen 4 can exert a desired pressure on the lower platen 3.

The operating lever 5 is then manually pushed back to the position shown in FIGURE 2. This rotates the bevel gears 29 and 33 and causes them to rotate the wedge member 35 so it drives down the roller member 39 and the platen frame supporting them to cause the upper platen 4 to press against the work W on the loser platen. The wedge member 35 rotates until the shoulder 57 on its cam plate 55 engages the lower end of the trigger member 63 on the upper arm.

Meanwhile, the simultaneously rotating spur gear drives the rack 46 toward the front of the arm, closing the contacts 68 of the limit switch 54, thus starting the timer motor 11a. The motor operates for a time preset by the timer pointer 12, during which time the lever 5 is left untouched and the heat pressing operation occurs. At the end of this time the timer switch 13 closes, completing the circuit through the solenoid 66 to cause it to retract the trigger member 63 from the cam plate shoulder 57 on the wedge member 35, thus allowing the spring 49 to draw the rack 46 toward the rear of the apparatus. This drives the spur gear 31 and the bevel gears 29 and 33 so that the wedge member 35 rotates in a direction to permit the springs 43 to retract the upper platen by a distance determined by rotation of the member 35 until its cam plate shoulder 56 engages the lower end of the trigger member 63. As the rack reaches the end of its stroke, the cam portion 53 on its end closes the contact members 69 on the limit switch 54 for a short time sufficient to energize the rear solenoid 25 and cause it to lift the lower end 22 of the latch member 21 out of the notch 23 on the base keeper member 24, thus allowing the springs 19 in the pivot members 18 to move the upper arm to its retracted position.

When the rack 46 completes its rearward travel, it no longer touches the contact members 68 and 69 of the limit switch 54, so they resume their normally open positions.

Movement of the rack of course causes the lever arm 5 to move toward the front of the apparatus to the position shown in FIGURE 1. Such movement of the lever 5 and the upwardly swinging movement of the upper arm 2 are slowed to a safe speed by the retarding cylinders 48 and 72.

The construction and operation of the above press are such that the platens are brought together and closed with application of desired pressure, by two manual strokes or movements of the operating lever 5, neither of which requires the exertion of substantial manual force.

The first movement or stroke is effected by pulling the lever downwardly and forwardly from the position shown in FIGURE 1, which is the normal nonoperative position of the apparatus to which the parts are biased, to the position shown in FIGURE 2, in which the upper arm 2 is locked in its operative position by the rear latching means described above; the lower and upper platens 3 and 4 are then separated by a short distance. This movement requires only enough manual effort to overcome the resistance of the biasing springs 19 in the pivot members 18. Since the operating lever 5 is in its forward position, it also acts as an extension of the upper arm and thus adds to the mechanical advantage and reduces the manual effort required.

The next movement or stroke of the operating lever 5 is to push it manually to its retracted position shown in FIGURE 3; this moves the upper platen 4 downwardly against the lower platen 3 through the short distance between them and develops the desired pressure between them as determined by the platen adjusting means described above. Even though this mechanical pressure may be quite substantial, no great manual effort is required to exert it since the substantial mechanical advantage provided by the above described mechanism makes it possible to translate a small manual force applied to the lever arm for a substantial distance to a substantial force applied to the upper platen moving through a very small distance. The press therefore can be easily operated by little manual force.

The mechanical forces applied to the upper platen 4 are also balanced, since the platen moves in a guided path and since the wedge member has a plurality of identical equally spaced ramp surfaces which press against equally spaced followers carried by the platen. Hence the work W being operated upon is uniformly pressed over its area, particularly when the apparatus is designed as illustrated so that the contacting surfaces of the upper and lower platens are parallel when the platens are closed.

The apparatus can be readily and accurately adjusted to apply the desired heat and pressure for the desired time, after the platens are closed. The apparatus automatically moves the upper heated platen upward to halt the heat-pressing operation when desired, and this movement occurs sufficiently gradually so that there is no danger to the operator from rapidly moving parts, and no shocks from rapid movement which could dislodge the apparatus. The operating lever and upper arm are thus returned to positions where they are ready for another cycle.

The illustrated apparatus requires only electricity, and is so light and compact that it can readily be carried to different locations. Hence it is capable of a wide variety of uses in a wide variety of locations.

Various modifications may be made in the illustrated apparatus without departing from the invention. It is intended that the patent shall cover, by suitable expression in the appended claims, whatever features of patentable novelty reside in the invention.

I claim:

1. Press apparatus comprising a first support having a free end and a connected end, a second support having a free end and a connected end, means pivotally connecting said supports together at their connected ends to permit the free ends of said supports to be moved to an operative relation in which they are close to each other and to a retracted relation in which they are remote from each other, a first pressure member mounted on said first support near its free end for movement toward and away from said support, a second pressure member carried by said second support near its free end, an actuating member mounted on said first support for movement relative to the support between two positions, means operatively connecting said actuating member to said first pressure member so that when said actuating member is in one of its positions said first pressure member is in a withdrawn position closer to said first support and when said actuating member is in its other position said pressure member is in its extended position away from said first support, means releasably holding said supports with their free ends in operative relation, means for pivotally moving said supports relative to each other to locate their free ends in retracted relation, and means for releasing said holding means as said first pressure member moves to its withdrawn position relative to said first support to permit said supports to move pivotally away from each other toward the position in which their free ends are in retracted relation.

2. Press apparatus as claimed in claim 1 in which said means for pivotally moving said supports operates to bias said supports so that upon release of said means holding said supports said supports pivotally move away from each other so their free ends are in retracted relation.

3. Press apparatus comprising a base; a pressure member supported by said base; a movable arm pivotally mounted on said base at a location remote from said pressure member, said arm having an unsupported end which by pivotal movement of the arm may be located in an operative position near said base pressure member and to a retracted position remote from said base pressure member; a pressure member carried by said arm at its unsupported end and located so that when the arm is in its operative position said arm pressure member can overlap said base pressure member, said arm pressure member being mounted on said arm so it can move toward and away from said arm; an operating lever pivotally mounted on said arm for movement relatively to said arm between an extreme position in which it extends towards the unsupported end of said arm and an extreme position in which it extends toward the pivot location on said arm; means operatively connecting said operating lever to said arm pressure member so that when said operating lever is in its extreme position extending toward the unsupported end of said arm said arm pressure member is closest to said arm and when said operating lever is moved to its extreme position toward the pivot location on said arm said arm pressure member moves away from said arm to its remotest position therefrom; means biasing said operatively connecting means to cause said operating lever to tend to move toward its extreme position in which it extends toward the unsupported end of said arm; releasable means for locking said operatively connecting means so that said operating lever remains in its extreme position in which it extends toward said pivot location on said arm; and means for releasing said locking means to permit said biasing means to cause said operatively connecting means to move said operating lever to its extreme position extending toward said unsupported end of said arm.

4. Press apparatus comprising a base; a pressure member supported by said base; a movable arm pivotally mounted on said base at a location remote from said pressure member, said arm having an unsupported end which by pivotal movement of the arm may be located in an operative position near said base pressure member and in a retracted position remote from said base pressure member; means biasing said arm toward its retracted position; a pressure member carried by said arm at its unsupported end and located so that when the arm is in its operative position said arm pressure member can overlap said base pressure member, said arm pressure member being mounted on said arm so it can move toward and away from said arm; and operating lever pivotally mounted on said movable arm for movement relatively to said arm between an extreme position in which it extends towards the unsupported end of said arm and an extreme position in which it extends toward the pivot location on said arm; means operatively connecting said operating lever to said arm pressure member so that when said operating lever is in its extreme position extending toward the unsupported end of said arm said arm pressure member is closest to said arm and when said operating lever is moved to its extreme position toward the pivot location on said arm said arm pressure member moves away from said arm to its remotest position therefrom; movable means biasing said operatively connecting means to cause said operating lever to tend to move toward its extreme position in which it extends toward the unsupported end of said arm; releasable means for locking said operatively connecting means so that said operating lever remains in its extreme position in which it extends toward said pivot location on said arm; releasable means for holding said arm in its operative position, said last-mentioned means being controlled to release said arm upon movement of said biasing means for said operatively connecting means; and means for releasing said means locking said operatively connecting means to permit movement of said biasing means for said operatively connecting means, whereby said arm is released and is moved by said arm biasing means to its retracted position.

5. Press apparatus comprising a support, a pressure member for exerting pressure, said pressure member being mounted for movement toward and away from said support; a member adapted to have force exerted against it by said pressure member; a rotatable wedge member rotatably and axially immovably mounted on said support about an axis fixed relatively to said support and extending in the direction of movement of said pressure member, said wedge member having a ramp surface facing axially away from said support; a follower member carried by said pressure member and adapted to bear against said ramp surface, said follower member being movable in a path parallel to and fixed relatively to the axis of rotation of said rotatable wedge member as said wedge member rotates, said follower member and the pressure member on which it is mounted being moved away from said support to a maximum distance from said support on rotation of said wedge member in one angular direction to an advanced position and being moved toward said support to a minimum distance from said support on rotation of said wedge member in the other angular direction to a retracted position; a member mounted on said support for movement in a generally planar path relatively to said support between advanced and retracted positions; means interconnecting said rotatable wedge member and said movable member so that when said wedge member rotates to its advanced position said movable member moves to its advanced position and when said movable member moves to its retracted position said wedge member rotates to its retracted position; means biasing said movable member for movement toward its retracted position; releasable latch means operative to lock said wedge member and said movable member in their advanced positions; means for releasing said latch means to permit said biasing means to move said movable member to its retracted position and cause said wedge member to rotate to its retracted position; and means for rotating said wedge member to its advanced position.

6. Press apparatus comprising a support, a pressure member for exerting pressure mounted for movement toward and away from said support; a member adapted to have force exerted against it by said pressure member; a rotatable member, for actuating said pressure member, axially immovably but rotatably mounted on said support about an axis fixed relatively to said support and extending in the direction of movement of said pressure member, said rotatable actuating member having an engaging surface facing axially away from said support; a non-rotatable member for actuating said pressure member carried by said pressure member for movement therewith in a path parallel to and fixed relatively to the axis of rotation of said rotatable actuating member, said non-rotatable actuating member having an engaging surface that engages the engaging surface of said rotatable actuating member, said engaging surfaces cooperating so that when said rotatable actuating member is rotated in one angular direction toward an advanced position said non-rotatable actuating member and the pressure member carrying it move away from said support and when said rotatable actuating member is rotated in the other angular direction toward a retracted position said non-rotatable actuating member and the pressure member carrying it move toward said support; a member mounted on said support for movement in a fixed path relative to said support between advanced and retracted positions; means interconnecting said rotatable actuating member and said movable member so that when said rotatable actuating member rotates to its advanced position said movable member moves to its advanced position and when said movable member moves to its retracted position said rotatable actuating member rotates to its retracted position; means biasing said movable member toward its retracted position; releasable latch means operative to lock said rotatable actuating member and said movable member in their advanced positions; and means for releasing said latch means to permit said biasing means to move said movable member to its retracted position and cause said rotatable actuating member to rotate to its retracted position.

7. Press apparatus comprising a support, a pressure member for exerting pressure, said pressure member being mounted for movement toward and away from said support; a member adapted to have force exerted against it by said pressure member; a rotatable wedge member rotatably and axially immovably mounted on said support about an axis fixed relatively to said support and extending in the direction of movement of said pressure member, said wedge member having a ramp surface facing axially away from said support; a follower member carried by said pressure member and adapted to bear against said ramp surface, said follower member being movable in a path parallel to and fixed relatively to the axis of rotation of said rotatable wedge member as said wedge member rotates, said follower member and the pressure member on which it is mounted being moved away from said support to a maximum distance from said support on rotation of said wedge member in one angular direction to an advanced position and being moved toward said support to a minimum distance from said support on rotation of said wedge member in the other angular direction to a retracted position; an elongated rack mounted on said support for longitudinal movement between advanced and retracted positions; gear means interconnecting said rotatable wedge member and said rack so that when said wedge member rotates to its advanced position said rack moves to its advanced position and when said rack moves to its retracted position said wedge member moves to its retracted position; means biasing said rack for movement toward its retracted position; latch means operative to lock said wedge member and said rack in their advanced positions; means for releasing said latch means to permit said biasing means to move said rack to its retracted position and cause said wedge member to rotate to its retracted position; and means for rotating said wedge member to its advanced position.

8. Press apparatus comprising a support, a pressure member for exerting pressure, said pressure member being mounted for movement toward and away from said support; a member adapted to have force exerted on it by said pressure member; a rotatable wedge member rotatably and axially immovably mounted on said support about an axis fixed relatively to said support and extending in the direction of movement of said pressure member, said wedge member having a ramp surface facing axially away from said support and a generally radially extending shoulder surface; a follower member carried by said pressure member and adapted to bear against said ramp surface, said follower member being movable in a path parallel to and fixed relatively to the axis of rotation of said rotatable wedge member as said wedge member rotates, said follower member and the pressure member on which it is mounted being moved away from said support to a maximum distance from said support on rotation of said wedge member in one angular direction to an advanced position and being moved toward said support to a minimum distance from said support on rotation of said wedge member in the other angular direction to a retracted position; an elongated rack mounted on said support for longitudinal movement between advanced and retracted positions; gear means interconnecting said rotatable wedge member and said rack so that when said wedge member rotates to its advanced position said rack moves to its advanced position and when said rack moves to its retracted position said wedge member moves to its retracted position; means biasing said rack for movement toward its retracted position; latch means operative to engage said shoulder in said wedge means to lock said wedge member and said rack in their advanced positions; means for releasing said latch means to permit said biasing means to move said rack to its retracted position and cause said wedge means to rotate to its retracted position; and means for rotating said wedge member to its advanced position.

9. Press apparatus comprising a support; a pressure member for exerting pressure mounted for movement toward and away from said support; a member adapted to have force exerted against it by said pressure member; a rotatable member, for actuating said pressure member, axially immovably but rotatably mounted on said support about an axis fixed relatively to said support and extending in the direction of movement of said pressure member, said rotatable actuating member having an engaging surface facing axially away from said support; a non-rotatable member for actuating said pressure member carried by said pressure member for movement therewith in a path parallel to and fixed relatively to the axis of rotation of said rotatable actuating member, said non-rotatable actuating member having an engaging surface that engages the engaging surface of said rotatable actuating member, said engaging surfaces cooperating so that when said rotatable actuating member is rotated in one angular direction toward an advanced position said non-rotatable actuating member and the pressure member carrying it move away from said support and when said rotatable actuating member is rotated in the other angular direction toward a retracted position said non-rotatable actuating member and the pressure member carrying it move toward said support; means for rotating said rotatable actuating member toward its advanced position to cause said pressure member to move away from said support to an advanced position; means for releasably locking said rotatable actuating member in its advanced position; means biasing said rotatable actuating member for movement toward its retracted position; and means for releasing said locking means to permit said biasing means to cause said rotatable actuating member to rotate to its retracted position.

10. Press apparatus comprising a support, a pressure member for exerting pressure mounted for movement toward and away from said support; a member adapted to have force exerted against it by said pressure member; means for positively moving said pressure member away from said support comprising a rotatable wedge member axially immovably but rotatably mounted on said support about an axis fixed relatively to said support and extending in the direction of movement of said pressure member, said wedge member having at least one ramp surface thereon facing axially away from said support; follower means carried by said pressure member and bearing on said ramp surface of said wedge member so that rotation of said wedge member in one angular direction toward an advanced position forces said follower means and said pressure member away from said support to an advanced position of said pressure member, and so that rotation of said wedge member in the opposite angular direction toward a retracted position permits said follower means and the pressure member carrying it to move toward said support; means releasably locking said wedge member in its advanced position; means biasing said wedge member for rotation toward its retracted position; and means for releasing said locking means to permit said biasing means to rotate said wedge member to its retracted position.

11. The apparatus of claim 10 in which the ramp surface of said rotatable wedge member is one of two identical axially facing ramp surfaces angularly spaced 180° apart about the axis of rotation of said wedge member, and in which rotatable followers bear against each of said surfaces, said followers being rotatably supported from said pressure member about axes 180° apart.

12. Press apparatus comprising a generally horizontal base; a pressure member carried by said base; an arm having an unsupported end and a supported end pivotally carried by said base for movement from a lower position in which its unsupported end is nearest to said base to a retracted position in which its unsupported end is remote from said base; a pressure member carried by said arm adjacent its unsupported end and adapted to exert force against said base pressure member; means biasing said arm so its unsupported end is urged away from said base; a downwardly biased latch member carried by said arm and constrained against movement transversely thereof relatively to said arm but capable of movement upwardly and downwardly relatively to said arm; a keeper member carried by said base and having stop means located to be engaged by said latch member when said arm is in a lower position; and means for raising said latch member to disengage it from said stop means of said keeper member and permit said arm to be moved to its retracted position by said biasing means.

13. In a press of the type having a base and a pressure member thereon, a bellcrank lever and means mounting it on the base to swing pivotally about an axis, said bellcrank lever having one arm projecting forwardly into overlying relation to the base and another arm projecting toward the base, a pressure member mounted on the overlying arm of said bellcrank lever in overlying generally confronting relation to said base pressure member, keeper means on the base, latch means on the said other arm of said bellcrank lever and engageable with said keeper means to lock said lever in predetermined position, and means projecting from the base and actuatable externally thereof for shifting said keeper means to adjust the locking position of said bellcrank lever.

14. In a press as defined in claim 13, said adjusting means comprising a wheel having an irregular periphery and said keeper means comprising a spring biased member engaging the wheel periphery.

15. In a press as defined in claim 13 said keeper means comprising an elongated bar, guide means on the base engaging said bar and constraining it to endwise movement, resilient means biasing said bar in that direction which, when said bellcrank lever is interlocked with said keeper means, increases the spacing between said pressure members, and means carried by the base and engageable with said bar of said keeper means to resist movement of said bar in the direction in which it is biased.

16. Press apparatus comprising a generally horizontal base; a pressure member carried by said base; an arm having an unsupported end and a supported end pivotally carried by said base for movement from a lower position in which its unsupported end is nearest to said base to a retracted position in which its unsupported end is remote from said base; a pressure member carried by said arm adjacent its unsupported end and adapted to exert force against said base pressure member; means biasing said arm so its unsupported end is urged away from said base; a downwardly extending latch member carried by said arm constrained against movement transversely thereof relative to said arm; a generally horizontal keeper member carried by said base and having stop means located to be engaged by said latch member when said arm is in its lower position; and means for lowering said keeper member to disengage its stop means from said latch member and permit said arm to be moved to its retracted position by said biasing means.

17. Press apparatus comprising a generally horizontal base; a pressure member carried by said base; an arm having an unsupported end and a supported end pivotally carried by said base about a pivot axis for movement from a lower position in which its unsupported end is nearest to said base to a retracted position in which its unsupported end is remote from said base; a pressure member carried by said arm and adapted to exert force against said base pressure member; means biasing said arm so its unsupported end is urged away from said base; a downwardly extending latch member carried by said arm constrained against movement transversely thereof relative to said arm; a generally horizontal keeper member carried by said base and having stop means located to be engaged by said latch member when said arm is in its lower position; means for separating said latch member and said keeper member to disengage said latch member from said stop means of said keeper member, to permit said arm to be moved to its retracted position by said biasing means; and means for adjusting the position of said stop means on said keeper member transversely relatively to said pivot axis to adjust the distance between the unsupported end of said arm and said base when said arm is in the lower position.

18. Manually operable press apparatus comprising a base; a pressure member supported by said base; a movable arm pivotally mounted on said base at a location remote from said pressure member, said arm having an unsupported end which by pivotal movement of the arm may be located in an operative position near said base pressure member and in a retracted position remote from said base pressure member; means biasing said arm for movement toward its retracted position; pressure member carried by said arm at its unsupported end and located so that when the arm is in its operative position said arm pressure member can overlie said base pressure member, said arm pressure member being mounted on said arm so it can move toward and away from said arm in a fixed path; an operating lever pivotally mounted on said arm for manual movement relatively to said arm between two extreme positions; a rotatable wedge member rotatably and axially immovably mounted on said arm about an axis fixed relatively to said arm and extending in the direction of movement of said pressure member, said wedge member having a ramp surface facing axially away from said arm; a follower member carried by said arm pressure member and adapted to bear against said ramp surface, said follower member and said arm pressure member being moved away from said arm to a maximum distance from said arm on rotation of said wedge member in one angular direction and being moved toward said arm to a minimum distance from said arm on rotation of said wedge member in the other angular direction; a member mounted on said arm for movement in a generally planar path relatively to said arm between advanced and retracted positions; means connecting said operating lever to said wedge member to cause said wedge member to rotate to its advanced position when said lever is manually moved to one of its extreme positions; means interconnecting said rotatable wedge member and said operating member so that when said wedge member rotates to its advanced position said movable member moves to its advanced position, and when said movable member moves to its retracted position said wedge member rotates to its retracted position; means biasing said movable member for movement toward its retracted position; releasable means on said arm for holding said wedge member and said movable member in their advanced positions; releasable means associated with said arm and said base for holding said arm in its operative position, said means being operative to release said arm upon movement of said movable member toward its retracted position; and means for releasing said means for holding said wedge member and said movable member in their advanced positions.

19. A manually operable device of the character described comprising a base; a pressure member supported by said base; a movable arm pivotally mounted on said base at a location remote from said pressure member, said arm having an unsupported end which by pivotal movement of the arm may be located in an operative position near said base pressure member and in a retracted position remote from said base pressure member; means biasing said arm for movement toward its retracted position; a pressure member carried by said arm at its unsupported end and located so that when the arm is in its operative position said arm pressure member can contact said base pressure member; said arm pressure member being mounted on said arm so it can move toward and away from said arm in a fixed path; an operating lever pivotally mounted on said arm for movement relatively to said arm between an extreme advanced position in which it extends towards the unsupported end of said arm and an extreme retracted position in which it extends toward the pivot location on said arm; a rotatable wedge member rotatably and axially immovably mounted on said arm about an axis fixed relatively to said arm and extending in the direction of movement of said arm pressure member, said wedge member having a plurality of identical ramp surfaces facing axially away from said arm and equiangularly spaced around the axis of rotation of said wedge member, said wedge member also having a generally radial shoulder surface; a plurality of follower members carried by said arm pressure member and adapted to bear against said ramp surfaces, said follower members and said arm pressure member being moved away from said arm to a maximum distance from said arm on rotation of said wedge member in one angular direction and being moved toward said arm to a minimum distance from said arm on rotation of said wedge member in the other angular direction; a rack slidably mounted on said arm for movement between advanced and retracted positions, gear means connecting said operating lever to said wedge member and to said rack for rotating said wedge member to its advanced position when said lever is manually moved to its retracted position and for moving said rack to its advanced position when said wedge member rotates to its advanced position, and for moving said lever member to its advanced position and for rotating said wedge member to its retracted position when said rack moves to its retracted position; means biasing said rack for movement toward its retracted position; releasable means on said arm for engaging said shoulder surface on said wedge member for holding said wedge member and said movable member in their advanced positions; releasable means associated with said arm and said base for holding said arm in its operative condition; means for releasing said arm holding means to release said arm upon movement of said rack toward its retracted position; and means for releasing said means for engaging said wedge member shoulder surface at the end of predetermined interval beginning when movement of said operating lever to its retracted position is initiated.

References Cited in the file of this patent

UNITED STATES PATENTS

| | | |
|---|---|---|
| 346,335 | Weickum | July 27, 1886 |
| 565,668 | Brinkley | Aug. 11, 1896 |
| 995,516 | Antoine | June 20, 1911 |
| 1,076,163 | Shirley | Oct. 21, 1913 |
| 1,294,396 | Calleson | Feb. 18, 1919 |
| 1,579,480 | Hoover | Apr. 2, 1926 |
| 2,082,551 | Raney | June 1, 1937 |
| 2,237,449 | Ryan | Apr. 8, 1941 |
| 2,624,389 | Bungay | Jan. 6, 1953 |
| 3,033,735 | Winberg | May 8, 1962 |
| 3,035,510 | Carpenter et al. | May 22, 1962 |

FOREIGN PATENTS

| | | |
|---|---|---|
| 13,234 | Great Britain | 1911 |
| 443,690 | Great Britain | Mar. 4, 1936 |
| 282,745 | Switzerland | Aug. 16, 1952 |